(12) United States Patent
Williams

(10) Patent No.: US 7,031,325 B1
(45) Date of Patent: Apr. 18, 2006

(54) METHOD AND APPARATUS FOR ENABLING A NETWORK DEVICE TO OPERATE IN ACCORDANCE WITH MULTIPLE PROTOCOLS

(75) Inventor: Robert A. Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1032 days.

(21) Appl. No.: 09/824,701

(22) Filed: Apr. 4, 2001

(51) Int. Cl.
  *H04L 12/28* (2006.01)
(52) U.S. Cl. .................................. 370/401
(58) Field of Classification Search ............... 370/389, 370/392, 395.5, 400–401, 466
  See application file for complete search history.

(56) References Cited

U.S. PATENT DOCUMENTS 6,128,654 A * 10/2000 Runaldue et al. ........... 709/219

2002/0009081 A1 * 1/2002 Sampath et al. ............ 370/389

OTHER PUBLICATIONS

"SmartSwitch 2000 Firmware version 4.05.06", Aug. 1998, Cabletron Systems, Inc.*

* cited by examiner

*Primary Examiner*—Huy D. Vu
*Assistant Examiner*—Jason Mattis
(74) *Attorney, Agent, or Firm*—Harrity Snyder, LLP

(57) ABSTRACT

A network device that controls the communication of data frames between stations includes receive ports that receive data frames from the stations. The network device also includes a memory that stores address information and data forwarding information associated with the received data frames. The network device further includes processing logic that processes and forwards the received data frames in accordance with one of two protocols. In accordance with a first protocol, the network device forwards the data frames to their destinations without modifying the respective data frames. In accordance with a second protocol, the network device may modify the data frames before forwarding the data frames to their respective destinations.

18 Claims, 7 Drawing Sheets

| STATIC BIT | HIT BIT | VLAN INDEX | PORT VECTOR | MAC ADDRESS | NEXT POINTER |
|---|---|---|---|---|---|

| PRIORITY CLASS | PORT VECTOR | UNTAGGED SET | RX PORT | VLAN ID | OPCODE | FRAME POINTER |

METHOD AND APPARATUS FOR ENABLING A NETWORK DEVICE TO OPERATE IN ACCORDANCE WITH MULTIPLE PROTOCOLS

TECHNICAL FIELD

The present invention relates generally to network communications and, more particularly, to a network device capable of operating in one of two modes.

BACKGROUND ART

In computer networks, a number of network stations are typically interconnected via a communications medium. For example, Ethernet is a commonly used local area network (LAN) scheme in which multiple stations are connected to a shared or dedicated serial data path. These stations often communicate with a switch or some other network device located between the data path and the stations connected to that path. The switch typically controls the communication of data and includes logic for receiving and forwarding data frames to their appropriate destinations.

In an Ethernet network operating in accordance with IEEE 802.1Q, every frame coming into a switch or bridge must be assigned to a virtual local area network (VLAN). If the frame arrives with no explicit VLAN tag, the frame is assigned to a default VLAN that is associated with the port on which the frame was received.

The IEEE 802.1Q protocol also includes a number of rules defining when data frames transmitted from a switch or bridge must include VLAN tags and when they must not. For any given VLAN, each port of the switch or bridge is either a member of the untagged set for that VLAN or it is not a member of the untagged set. If the port is a member of the untagged set, all frames that belong to the given VLAN and are forwarded from that port must be transmitted without a VLAN tag.

A port that is a member of the untagged set for one VLAN, however, can at the same time be omitted from the untagged set for another VLAN. This means that a port may have to remove VLAN tags from frames belonging to one VLAN and add VLAN tags to frames belonging to another VLAN.

In an Ethernet network operating in accordance with IEEE 802.1D, switches must ignore VLANs. That is, data frames must be forwarded exactly the way they were received. If a frame arrives with a VLAN tag, it must be forwarded with a VLAN tag. Similarly, if a frame arrives without a VLAN tag, it must be forwarded without a VLAN tag.

Due to these conflicting rules, a switch operating in accordance with the IEEE 802.1Q protocol is not compatible with the IEEE 802.1D protocol and vice versa. For example, if a switch operating according to IEEE 802.1Q has all its ports programmed to be members of the untagged set for all VLANs, then all VLAN tags will be removed from received frames before they are forwarded. This is inconsistent with the IEEE 802.1D protocol in which a data frame must be forwarded exactly as it is received.

DISCLOSURE OF THE INVENTION

There exists a need for a mechanism that enables a network device to operate in accordance with both IEEE 802.1D and IEEE 802.1Q protocols. This and other needs are met by the present invention, where a network device includes a hardware mechanism that indicates whether the network device is operating in accordance with IEEE 802.1D or IEEE 802.1Q. When the network device is operating in accordance with IEEE 802.1D, processing related to modifying VLAN tag information is bypassed. This enables network devices operating in a manner consistent with the present invention to process frames in accordance with either of the two protocols.

According to one aspect of the present invention, a network device that controls communication of data frames between stations is provided. The network device includes a plurality of receive ports configured to receive data frames from the stations. The network device also includes a memory configured to store address information and data forwarding information associated with the received data frames. The network device further includes processing logic configured to process and forward the received data frames to destination addresses without modifying the received data frames, when the network device is operating in accordance with a first protocol. The processing logic is also configured to process and forward the received data frames to destination addresses, at least one of the received frames being modified before being forwarded, when the network device is operating in accordance with a second protocol.

Another aspect of the present invention provides a method in a network device that controls communication of data frames between stations. The method includes setting an operating mode to at least one of a first operating mode and a second operating mode for the network device. The method also includes storing information in a memory of a network device, the information including address information and data forwarding information, and receiving data frames on a plurality of receive ports of the network device. The method further includes processing and forwarding the received data frames to destination addresses without modifying the received data frames, when the network device is in the first operating mode. The method also includes processing and forwarding data frames to destination addresses, at least one of the received data frames being modified before being forwarded, when the network device is in the second operating mode.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

FIG. 4 is a diagram illustrating an entry in the address table of FIG. 3, according to an exemplary implementation consistent with the present invention.

FIG. 6 illustrates an exemplary forwarding descriptor consistent with an implementation of the present invention.

BEST MODE FOR CARRYING OUT THE INVENTION

The present invention will be described with the example of a switch in a packet switched network, such as an Ethernet network. It will become apparent, however, that the present invention is also applicable to other packet switched systems, as described in detail below, as well as to other types of systems in general.

Switch Architecture Overview

Figure 1:
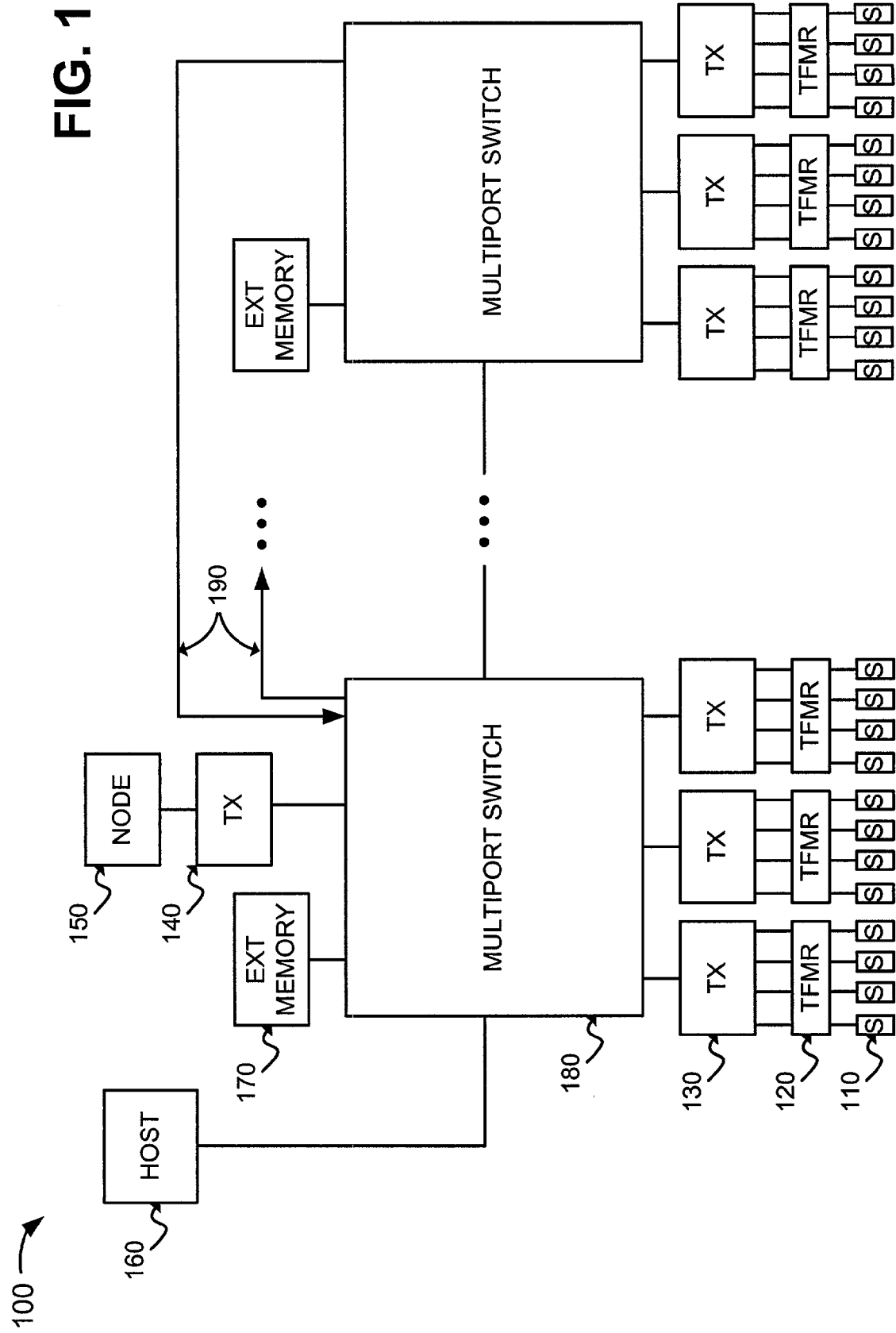
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
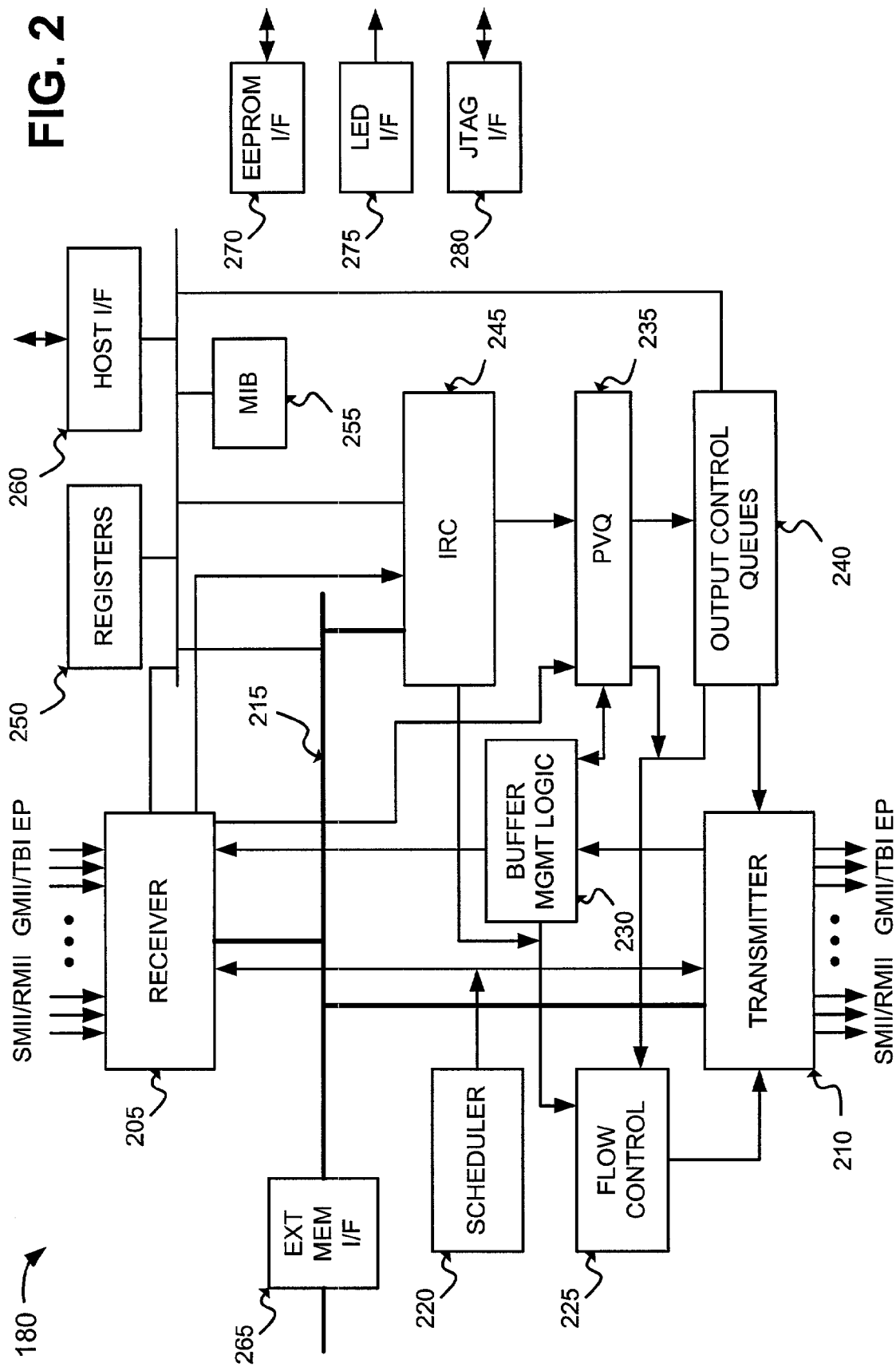
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Processing Data Frames According to Different Protocols

The present invention is directed to a network device, such as the multiport switch 180, that is able to process and forward data frames in accordance with more than one protocol. In an exemplary implementation, the multiport switch 180 includes hardware that enables it to modify VLAN information, when necessary, in accordance with the IEEE 802.1Q protocol and to ignore VLAN information in accordance with IEEE 802.1D protocol.

Figure 3:
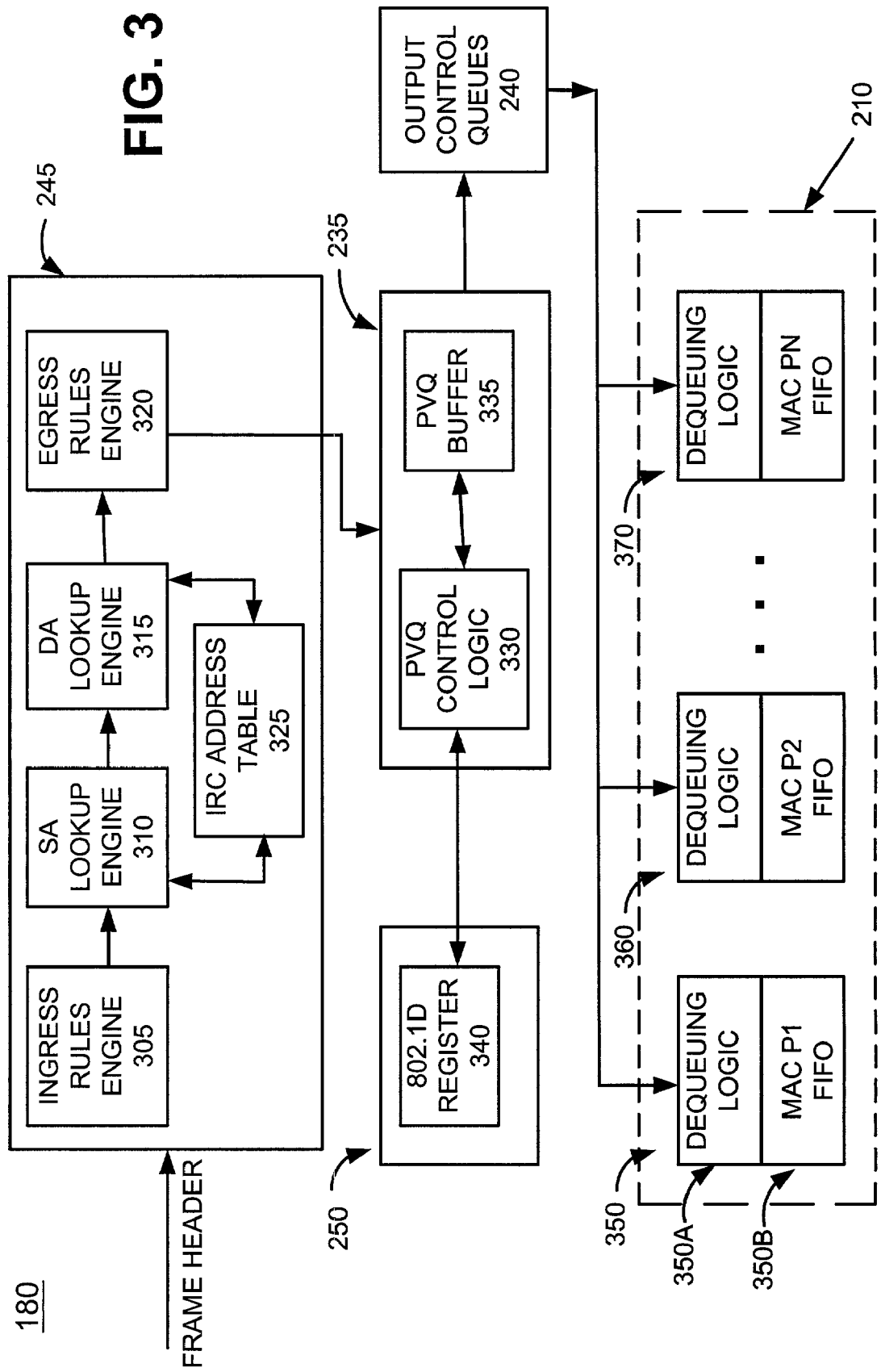
FIG. 3 is an exemplary detailed block diagram of a portion of the multiport switch of FIG. 2, consistent with an implementation of the present invention.

FIG. 3 illustrates a portion of multiport switch 180 consistent with an exemplary implementation of the present invention. Referring to FIG. 3, multiport switch 180 includes IRC 245, PVQ 235, output control queues 240, registers 250 and transmitter 210.

The IRC 245 includes ingress rules engine 305, source address (SA) lookup engine 310, destination address (DA) lookup engine 315, egress rules engine 320 and IRC address table 325. The ingress rules engine 305 performs a variety of pre-processing functions for each frame header. For example, ingress rules engine 305 may check whether the frame was received with errors. If a frame is received with errors, the ingress rules engine 305 may construct a forwarding descriptor with a null port vector, e.g., a port vector with all zeros or some other predetermined value, that will cause the frame to be discarded.

The IRC address table 325 supports a number of network addresses and capabilities for a number of VLANs. In an exemplary implementation, the IRC address table 325 supports 4096 addresses and 64 unique VLANS. The number of addresses and VLANs supported by the IRC address table 325, however, may be increased or decreased by changing the table size.

FIG. 4 illustrates an exemplary format of an entry in IRC address table 325. Referring to FIG. 4, the address table entry 400 includes a static bit, a hit bit, a VLAN index field, a port vector field, a MAC address field and a next pointer field. The static and hit bits are used by an aging state machine (not shown) during an aging process. The VLAN index field may be used to reference a VLAN identifier (ID). A VLAN index-to-ID table (not shown) may contain the mapping associations between the VLAN index and the VLAN ID. The port vector field identifies the port(s) to which a frame should be forwarded. The MAC address field is used for matching the address information included with the received data frames to an entry in the IRC address table 325. The next pointer field identifies another entry in the IRC address table 325 associated with searching the IRC address table 325. The fields illustrated in FIG. 4 are exemplary only. It should be understood that additional fields or other fields may be included in an IRC address table entry 400 in other implementations consistent with the present invention.

Figures 5A, 5B:
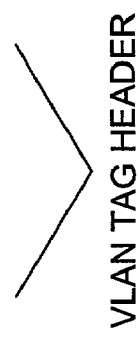
FIGS. 5A and 5B illustrate exemplary data frames received by the multiport switch of FIG. 2.

The SA lookup engine 310 and DA lookup engine 315 perform hash searches of the IRC address table 325 to find entries associated with the MAC source address, MAC destination address and VLAN index associated with the respective data frames. In an exemplary implementation of the present invention, the multiport switch 180 may receive data frames with or without a VLAN tag. For example, FIGS. 5A and 5B illustrate exemplary data frames received by multiport switch 180. Referring to FIG. 5A, data frame 510 includes a frame header consisting of a destination address field, a source address field and a type/length field. The source and destination address fields include addresses for the source and destination, respectively, of the data frame. The type/length field includes data that identifies the data link protocol used to connect the source and destination or information that identifies the length of the data frame. Data frame 510 also includes a data field that carries the actual payload of the data frame and a frame check sequence (FCS) field that includes error detection information.

FIG. 5B illustrates a data frame that includes VLAN information. Referring to FIG. 5B, data frame 520 includes a frame header that includes destination address and source address fields, a VLAN tag header and a length field. The source and destination address fields include addresses for the source and destination, respectively, of the data frame. The length field includes data that identifies the length of the data frame. The VLAN tag header includes a 16-bit VLAN tag protocol identifier (TPID) field and a 16-bit tag control information (TCI) field. The TCI field includes a 3-bit user priority field, a 1-bit canonical format indicator (CFI) and a 12-bit VLAN identifier (ID). The multiport switch 180 may ignore the CFI in implementations consistent with the present invention.

The multiport switch 180, consistent with the present invention, classifies received data frames as untagged, VLAN-tagged or priority-tagged. An untagged frame has no VLAN tag header (e.g., data frame 510). A VLAN-tagged frame has a VLAN tag header with a non-zero VLAN identifier. A priority-tagged frame has a VLAN tag header whose VLAN identifier is zero.

If the multiport switch 180 is operating in accordance with IEEE 802.1Q protocol and a data frame is untagged or priority-tagged, the multiport switch 180 may assign a VLAN to the data frame based on the port on which the data frame was received. In an exemplary implementation of the present invention, the multiport switch 180 assigns a VLAN index using a VLAN port-to-index table (not shown). If the multiport switch 180 is operating in accordance with IEEE 802.1Q protocol and a data frame is VLAN-tagged, the data frame is assigned a VLAN index based on the 12-bit VLAN ID found in the TCI field of the VLAN tag header.

If, on the other hand, the multiport switch 180 is operating in accordance with IEEE 802.1D protocol, the multiport switch 180 may assign all data frames to a default VLAN, in an implementation consistent with the present invention. For example, the multiport switch 180 may assign all data frames to a default VLAN whose index is "1," as described in more detail below.

Returning to FIG. 3, the SA lookup engine 310 performs a hash search of IRC address table 325 to find an entry whose address and VLAN index match the source address and VLAN index associated with the data frame. Any number of user-defined hash polynomials may be used to implement a hashing function to search the IRC address table 325. The DA lookup engine 315 performs a hash search of IRC address table 325 to find an entry whose address and VLAN index match the destination address and VLAN index associated with the data frame. The DA lookup engine 315 passes information in the port vector field of an address entry where a match is found to the egress rules engine 320.

The egress rules engine 320 receives the port vector information and may then create a forwarding descriptor for the data frame. FIG. 6 illustrates an exemplary forwarding descriptor consistent with an implementation of the present invention. Referring to FIG. 6, forwarding descriptor 600 includes a priority class field, a port vector field, an untagged set field, a receive (RX) port field, a VLAN ID field, an opcode field and a frame pointer field. The priority class field indicates the output priority queue in which the frame pointer should be placed (e.g., high priority or low priority). The port vector field identifies each port(s) that should receive the data frame for transmission to its destination address.

The untagged set field indicates which ports should remove VLAN tag headers before transmitting frames, as described in more detail below. The information in the untagged set field may be obtained from an untagged set table (not shown). In an exemplary implementation consistent with the present invention, the untagged set table contains 64 entries, with each entry corresponding to a particular VLAN index. The untagged set field identifies the ports that must remove VLAN tag headers, if frames destined for the VLAN are to be transmitted through that port. The untagged set may be managed by host 160.

The receive (RX) port field indicates the port on which the frame was received. The VLAN ID field is a 12-bit field that includes the VLAN identifier associated with the data frame. The opcode field contains information indicating how the data frame should be modified, if necessary, before transmission. In an exemplary implementation, the opcode field includes information indicating whether the data frame was untagged, priority-tagged or VLAN-tagged. The PVQ 235 may then use this information, as described in more detail below, to determine whether modifications to the data frame are required prior to transmitting the data frame. The frame pointer field identifies the location in external memory 170 where the data frame is stored.

Referring back to FIG. 3, the egress rules engine 320 forwards the forwarding descriptor 600 to PVQ 235. PVQ 235 includes PVQ control logic 330 and PVQ buffer 335. The PVQ buffer 335 stores the forwarding descriptor 600. The PVQ control logic 330, as described in more detail below, decides how to the handle the VLAN information associated with a data frame based on information in the untagged set and opcode fields, along with information regarding the mode in which the multiport switch 180 is currently operating. The PVQ control logic 330 generates a new opcode in the forwarding descriptor and transfers the forwarding descriptor to the appropriate queue(s) in output control queues 240.

Registers 250 may include 802.1D register 340. The 802.1D register 340 may store one or more bits that when set, indicate that multiport switch 180 is operating according to IEEE 802.1D protocol. The PVQ control logic 330 may access 802.1D register 340 when generating the new opcode.

The output control queues 240 receive the forwarding descriptor with the new opcode and queue the forwarding descriptor for transmission via transmitter 210. The transmitter 210 includes MAC modules labeled 350, 360 and 370 corresponding to output ports 1 through N, respectively. Each MAC module may include dequeuing logic and a transmit FIFO buffer. For example, MAC module 350 includes dequeuing logic 350A and a transmit FIFO buffer, labeled 350B. The other MAC modules may similarly include dequeuing logic and transmit FIFO buffers.

Figure 7:
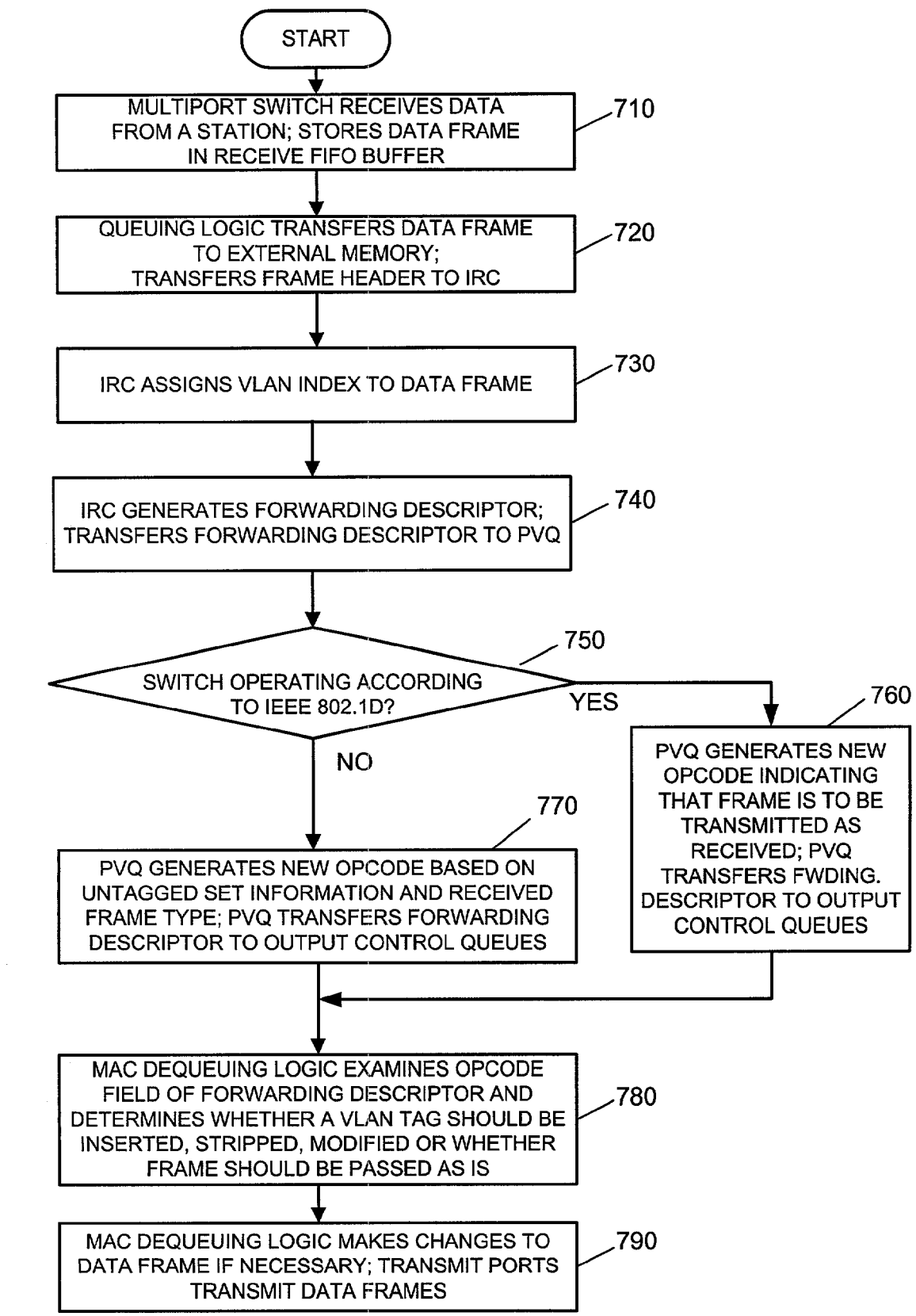
FIG. 7 is a flow diagram illustrating exemplary processing by the multiport switch of FIG. 2 in an implementation consistent with the present invention.

FIG. 7 illustrates exemplary processing by multiport switch 180 in an implementation consistent with the present invention. Processing may begin upon start-up of multiport switch 180 and host CPU 160. Upon start-up, the multiport switch 180 initializes various registers and tables, such as the IRC address table 325, VLAN index-to-ID table, VLAN port-to-index table, 802.1D register 340, etc. The host CPU 160 may be involved in initializing the various tables and registers. In this case, the multiport switch 180 and host CPU 160 establish communications via host interface 260 (FIG. 2).

After the various tables and registers are initialized, assume that a network station 110 transmits a data frame and multiport switch 180 receives the data frame [step 710]. The multiport switch stores the received data frame in a receive FIFO buffer in receiver 205 [step 710]. Queuing logic located in receiver 205 may obtain a frame pointer from a buffer located in buffer management logic 230. The queuing logic may then transfer the data frame to external memory 170, via external memory interface 265, at the location identified by the frame pointer [step 720]. The queuing logic may also transfer the frame header to IRC 245 [step 720].

The IRC 245 may then assign a VLAN index to the data frame [step 730]. As described previously, a data frame may include VLAN tag information (FIG. 5B) or may include no VLAN tag information (FIG. 5A). The IRC 245, consistent with the present invention, reads the contents of the 802.1D register 340 to determine whether the multiport switch 180 is operating in accordance with IEEE 802.1D protocol. If the 802.1D register 340 is not set, this indicates that the multiport switch 180 is operating in accordance with IEEE 802.1Q protocol. In this case, when a data frame is VLAN-tagged, the IRC 245 assigns a VLAN index to the data frame based on the VLAN ID included in the received data frame. If the multiport switch 180 is operating in accordance with IEEE 802.1Q protocol and the data frame is untagged or priority-tagged, the IRC 245 assigns a VLAN index to the frame based on the port on which the frame was received.

If the multiport switch 180 is operating in the IEEE 802.1D protocol (i.e., the 802.1D register 340 is set), the multiport switch 180 may assign the data frame to a default VLAN having an index of "1," regardless of whether the data frame is VLAN-tagged, untagged or priority tagged. As such, when operating in the IEEE 802.1D mode, each entry in the IRC address table 325 may have a VLAN index value of "1" and all data frames may be treated as belonging to the same VLAN for the purpose of performing searches in the IRC address table 325. This enables the IRC 245 to perform IRC address table 325 searches when the multiport switch 180 is operating in accordance with IEEE 802.1D protocol and IEEE 802.1Q protocol without modifying the IRC 245 hardware.

In any event, the IRC 245 may then perform a hash search of IRC address table 325 to identify an entry whose address and VLAN index match the source address and VLAN index associated with the data frame. The IRC 245 may then perform a second hash search of IRC address table 325 to find an entry whose address and VLAN index match the destination address and VLAN index associated with the data frame.

The IRC 245 then generates a forwarding descriptor 600 (FIG. 6) and outputs the forwarding descriptor to PVQ 235 [step 740]. In an exemplary implementation, the opcode field included in forwarding descriptor 600 received by the PVQ 235 includes information indicating whether the received data frame was untagged, priority-tagged or VLAN-tagged. The PVQ control logic 330 receives the forwarding descriptor 600 and may then determine whether the multiport switch 180 is operating in accordance with IEEE 802.1D protocol [step 750]. In an exemplary implementation, the PVQ control logic 330 reads the contents of the 802.1D register 340 to determine whether the multiport switch 180 is operating in accordance with IEEE 802.1D. If the 802.1D register 340 is set, this indicates that the multiport switch 180 is processing data frames in accordance with IEEE 802.1D protocol. As described previously, data frames processed in accordance with the IEEE 802.1D protocol must be forwarded exactly as they are received. In other words, if a data frame is received with a VLAN tag, that data frame must be forwarded with that VLAN tag and if a data frame is received without a VLAN tag, that data frame must be forwarded without a VLAN tag.

If the PVQ control logic 330 determines that the 802.1D register 340 is set, the PVQ control logic 330 may generate a new opcode indicating that the transmit port(s) identified in the port vector field should transmit the data frame as received (i.e., no stripping VLAN tag information, no inserting VLAN tag information and no modifying VLAN tag information are to occur for that data frame). The PVQ control logic 330 then transfers the forwarding descriptor with the new opcode to the appropriate queue(s) in output control queues 240 [step 760]. The output control queues 240 provide storage for the forwarding descriptor while awaiting processing by the transmitter 210, as described in more detail below.

If the PVQ control logic 330 determines that the multiport switch 180 is not operating in accordance with IEEE 802.1D (e.g., 802.1D register 340 is not set, indicating that multiport switch 180 is operating according to IEEE 802.1Q protocol), the PVQ control logic 330 generates a new opcode indicating whether to insert a VLAN tag in the data frame, modify an existing VLAN tag or strip a VLAN tag [step 770]. The PVQ control logic 330 may generate the new opcode based on the received frame type and whether or not the port is a member of the VLAN's untagged set. In an exemplary implementation of the present invention, the PVQ control logic 330 determines whether to insert a VLAN tag, modify a VLAN tag or strip a VLAN tag based on the information in the untagged set and opcode fields of forwarding descriptor 600. Table 1 below summarizes how the PVQ control logic 330 may generate the new opcode based on the received frame type and whether or not the port is a member of the VLAN's untagged set, consistent with an implementation of the present invention.

TABLE 1

| Received Frame Type | Untagged Set Bit for TX Port | |
|---|---|---|
| | 1 | 0 |
| Untagged | Send Frame As Is | Insert Tag |
| Priority Tagged | Strip Tag | Modify Tag |
| VLAN Tagged | Strip Tag | Send Frame As Is |

The PVQ control logic 330 may then generate the new opcode based on the table above. As illustrated, the PVQ control logic 330 determines whether to: 1) send a data frame as is (e.g., when a received data frame is untagged and the untagged set bit for that port is set or when a received data frame is VLAN-tagged and the untagged set bit for that port is not set), 2) insert a tag (e.g., when a received data frame is untagged and the untagged set bit for that port is not set), 3) strip a tag (e.g., when a received data frame is priority-tagged or VLAN tagged and the untagged set bit for that port is set) and 4) modify a tag (e.g., when a received data frame is priority-tagged and the untagged set bit for that port is not set). In any event, the PVQ control logic 330 generates the new opcode and transfers the forwarding descriptor with the new opcode to the appropriate queue(s) in the output control queues 240 [step 770].

The dequeuing logic in the appropriate MAC module, such as dequeuing logic 350A, reads the forwarding descriptor from the output control queues 240, examines the opcode field to determine whether a VLAN tag should be inserted, stripped or modified or whether the data frame should be forwarded without modification [step 780]. The dequeuing logic 350A may then perform any necessary modification to the data frame while it transfers the data frame into the transmit FIFO buffer, such as transmit FIFO buffer 350B [step 790]. When inserting, modifying or stripping a VLAN header, the MAC modules calculate a new FCS for that data frame. Otherwise, the MAC transmit modules transmit the FCS field that is included with the received data frame. In either case, the MAC modules transmits the data frames from the transmit ports [step 790].

Described has been an apparatus and method for enabling multiport switch 180 to process data frames in accordance with IEEE 802.1D and IEEE 802.1Q protocols. One advantage of the present invention is that the multiport switch 180 is able to process data frames according to either protocol, thereby enhancing the functionality of multiport switch 180. Another advantage of the present invention, is that the IRC engines 305–320 are able to process data frames according to either protocol in the same manner since all incoming data frames are assigned to a VLAN. This significantly reduces the processing logic needed to support both protocols.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described in relation to an IRC address table 325 containing certain fields and a forwarding descriptor containing certain fields. It should be understood that the fields in the IRC address table 325 and forwarding descriptor may include other fields based on the particular user's requirements.

What is claimed is:

1. A network device configured to control communication of data frames between stations, comprising:
   a plurality of receive ports configured to receive data frames from the stations;
   a buffer configured to buffer the received data frames;
   queuing logic configured to:
      obtain a frame pointer for each of the received data frames, each frame pointer identifying a location in a memory located externally from the network device, and
      transfer each of the received data frames to the external memory for storage in a location identified by one of the respective frame pointers;
   a memory configured to store address information and data forwarding information associated with the received data frames;
   processing logic configured to: and
      identify data forwarding information for a first one of the received data frames, the data forwarding information identifying at least a first transmit port and a first virtual local area network (VLAN),
      generate a forwarding descriptor for the first data frame, the forwarding descriptor including:

a first field identifying at least one transmit port, and
a second field including information identifying whether the first data frame was at least one of untagged, VLAN-tagged or priority-tagged,
generate a first code indicating that the first data frame is to be transmitted without modification, when the network device is operating in accordance with a first protocol, and
generate a second code indicating that the first data frame is to be transmitted without a VLAN tag, the first data frame is to be transmitted with a VLAN tag or the first data frame is to be transmitted without modification, when the network device is operating in accordance with a second protocol and based on the contents of the first field and the second field; and
a register configured to store information indicating whether the network device is operating in accordance with the first protocol.

2. The network device of claim 1, wherein the first protocol is an IEEE 802.1D protocol and the second protocol is an IEEE 802.1Q protocol.

3. The network device of claim 1, wherein the processing logic is further configured to:
read the contents of the register, and
determine whether the network device is operating in accordance with the first protocol or the second protocol based on the contents of the register, the first protocol being an IEEE 802.1D protocol and the second protocol being an IEEE 802.1Q protocol.

4. The network device of claim 1, wherein when the network device is operating in accordance with the first protocol, the processing logic is configured to:
retrieve the first data frame received on one of the plurality of receive ports from the external memory, and
forward the first data frame to at least the first transmit port identified by the data forwarding information without at least one of inserting virtual local area network (VLAN) information into the first data frame, deleting VLAN information included with the first data frame or modifying VLAN information included with the first data frame.

5. The network device of claim 4, wherein when the network device is operating in accordance with the second protocol, the processing logic is configured to:
retrieve the first data frame received on one of the plurality of receive ports from the external memory,
at least one of insert VLAN information into the first data fame, delete VLAN information included with the first data frame or modify VLAN information included with the first data frame, based on whether the first transmit port is a member of an untagged set for the first VLAN, and
forward the first data frame to the first transmit port.

6. The network device of claim 1, wherein the processing logic is further configured to:
delete a VLAN tag in the first data frame based on the contents of the first field and the second field and whether the network device is operating in accordance with the second protocol.

7. In a network device that controls communication of data frames between stations, a method comprising:
setting an operating mode to at least one of a first operating mode and a second operating mode for the network device;
storing information in a memory of a network device, the information including address information and data forwarding information;
receiving data frames on a plurality of receive ports of the network device;
obtaining a frame pointer for each of the received data frames, each frame pointer identifying a location in an external memory relative to the network device;
transferring each of the received data frames to the external memory for storage in a location identified by one of the respective frame pointers;
transferring frame headers associated with the received data frames for processing;
identifying data forwarding information for a first one of the received data frames, the data forwarding information identifying at least a first transmit port and a first virtual local area network (VLAN);
generating a forwarding descriptor for the first data frame, the forwarding descriptor including:
a first field identifying at least one transmit port, and
a second field including information identifying whether the first data frame was at least one of untagged, VLAN-tagged or priority-tagged;
forwarding the first data frame to the first transmit port without modifying the first data frame, when the network device is operating in the first operating mode; and
at least one of inserting VLAN information into the first data frame, deleting VLAN information included in the first data frame or modifying VLAN information included in the first data frame, when the network device is operating in the second operating mode and based on the contents of the first field and the second field.

8. The method of claim 7, wherein the first operating mode corresponds to an IEEE 802.1D mode and the second operating mode corresponds to an IEEE 802.1Q mode.

9. The method of claim 7, wherein the setting an operating mode includes:
initializing a register, the register indicating whether the network device is operating in the first or second operating mode.

10. The method of claim 7, wherein when the network device is operating in the first operating mode, the method further comprises:
retrieving the first data frame received on one of the plurality of receive ports from the external memory; and
forwarding the first data frame to at least the first transmit port without at least one of inserting virtual local area network (VLAN) information into the first data frame, deleting VLAN information included with the first data frame or modifying VLAN information included with the first data frame.

11. The method of claim 10, wherein when the network device is operating in the second operating mode, the method further comprises:
retrieving the first data frame received on one of the plurality of receive ports from the external memory;
determining whether the first transmit port is a member of an untagged set for the first VLAN based on the first field;
wherein the at least one of inserting VLAN information into the first data fame, deleting VLAN information included in the first data frame or modifying VLAN information included with in the first data frame, based on whether the first transmit port is a member of an untagged set for the first VLAN; and forwarding the data frame to the first transmit port.

12. The method of claim 7, further comprising:

deleting a VLAN tag in the first data frame based on the contents of the first field and the second field and whether the network device is operating in the second operating mode.

13. A network device comprising:

a plurality of receive ports configured to receive data frames from a plurality of stations;

a plurality of transmit ports configured to transmit data frames;

queuing logic configured to:
 obtain a frame pointer for each of the received data frames, each frame pointer identifying a location in a first memory, the first memory being located externally with respect to the network device, and
 transfer the received data frames to the first memory for storage in a location identified by one of the respective frame pointers;

a second memory configured to store address information and data forwarding information associated with the received data frames;

a decision making engine configured to:
 identify data forwarding information for a first one of the received data frames, the data forwarding information identifying at least a first one of the transmit ports and a first virtual local area network (VLAN);
 generate a forwarding descriptor for the first data frame, the forwarding descriptor including:
  an untagged set field identifying at least one transmit port, and
  a first opcode field including information identifying whether the first data frame was at least one of untagged, VLAN-tagged or priority-tagged; and processing logic configured to:
 generate a second opcode to indicate that the first data frame is to be transmitted without modification, when the network device is operating in accordance with a first protocol, and
 generate a second opcode to indicate that the first data frame is to be transmitted without a VLAN tag, the first data frame is to be transmitted with a VLAN tag or the first data frame is to be transmitted without modification, when the network device is operating in accordance with a second protocol and based on the contents of the untagged set field and the first opcode field.

14. The network device of claim 13, wherein the first protocol corresponds to an IEEE 802.1D protocol and the second protocol corresponds to an IEEE 802.1Q protocol.

15. The network device of claim 13, further comprising:
a plurality of transmit modules corresponding to the transmit ports, at least a first one of the transmit modules being configured to:
 retrieve the first data frame from the first memory, and
 forward the first data frame to at least the first transmit port without at least one of inserting VLAN information into the first data frame, deleting VLAN information included with the first data frame or modifying VLAN information included with the first data frame, when the network device is operating in accordance with the first protocol.

16. The network device of claim 15, wherein the first transmit module is further configured to:
 at least one of insert VLAN information into the first data fame, delete VLAN information included with the first data frame or modify VLAN information included with the first data frame, when the network device is operating in accordance with the second protocol and based on the second opcode, and
 forward the first data frame to at least the first transmit port.

17. The network device of claim 13, wherein the decision making device is further configured to assign a default VLAN index to received data frames when the network device is operating in accordance with the first protocol.

18. The network device of claim 17, wherein the decision making device is further configured to at least one of assign a VLAN index to a received data frame based on the port on which the data frame was received or assign a VLAN index to a received data frame based on a VLAN identifier included in the received data frame, when the network device is operating in accordance with the second protocol.

* * * * *